(12) United States Patent
Gossow (10) Patent No.: US 10,176,554 B2
(45) Date of Patent: Jan. 8, 2019

(54) CAMERA CALIBRATION USING SYNTHETIC IMAGES

(71) Applicant: Google Inc., Mountain View, CA (US)

(72) Inventor: David Gossow, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 176 days.

(21) Appl. No.: 15/265,413

(22) Filed: Sep. 14, 2016

(65) Prior Publication Data

US 2017/0098305 A1    Apr. 6, 2017

Related U.S. Application Data (60) Provisional application No. 62/237,513, filed on Oct. 5, 2015.

(51) Int. Cl.
| | |
|---|---|
| *G06K 9/00* | (2006.01) |
| *G06T 3/40* | (2006.01) |
| *G06T 15/06* | (2011.01) |
| *H04N 17/00* | (2006.01) |
| *G06T 7/80* | (2017.01) |

(52) U.S. Cl.
CPC ............... *G06T 3/40* (2013.01); *G06T 7/80* (2017.01); *G06T 15/06* (2013.01); *H04N 17/002* (2013.01); *G06T 2207/10004* (2013.01); *G06T 2207/10024* (2013.01)

(58) Field of Classification Search
CPC ......... G06T 7/0018; G06T 15/06; G06T 3/40; G06T 2207/10024; G06T 2207/10004; H04N 17/002
See application file for complete search history.

(56) References Cited

U.S. PATENT DOCUMENTS

| | | | |
|---|---|---|---|
| 6,377,298 B1* | 4/2002 | Scheele | H04N 17/002 348/187 |
| 2002/0113878 A1* | 8/2002 | Iwai | G01C 3/08 348/187 |
| 2012/0293659 A1* | 11/2012 | Bandou | G06K 9/00791 348/148 |
| 2013/0176392 A1 | 7/2013 | Carr et al. | |
| 2014/0002452 A1 | 1/2014 | Levin et al. | |
| 2014/0241629 A1* | 8/2014 | Lerios | G06T 9/00 382/166 |
| 2014/0341465 A1 | 11/2014 | Li et al. | |
| 2015/0043784 A1 | 2/2015 | Flint et al. | |
| 2015/0356735 A1* | 12/2015 | Shimizu | B60R 1/00 348/148 |

OTHER PUBLICATIONS

International Search Report and Written Opinion for PCT Application No. PCT/US2016/046294 dated Oct. 20, 2016, 13 pages.

(Continued)

*Primary Examiner* — John Strege (57) ABSTRACT

A camera is to capture an actual image of a target pattern. A calibration device is to render pixels in a synthetic image of the target pattern by tracing rays from the pixels to corresponding points on the target pattern based on model parameters for a camera. The calibration device is to also modify the model parameters to minimize a measure of distance between intensities of the pixels in the synthetic image and intensities of pixels in the actual image.

18 Claims, 8 Drawing Sheets

(56) References Cited

OTHER PUBLICATIONS

Written Opinion of the International Preliminary Examining Authority dated Oct. 16, 2017 for PCT/US16/052862, 6 pages.
S. Baker, I. Matthews, "Lucas-Kanade 20 Years on: A Unifying Framework: Part 1", International Journal of Computer Vision, vol. 56, No. 3, Feb. 7, 2003, 35 pages.
P. Eisert, "Model-Based Camera Calibration Using Analysis by Synthesis Techniques", Vision, Modeling, and Visualization 2002: Proceedings, Nov. 20-22, 2002, Erlangen, Germany, 8 pages.
W. T. Fong , S. K. Ong , A. Y. C. Nee, "Computer Vision Centric Hybrid Tracking for Augmented Reality in Outdoor Urban Environments", Proceedings of the 8th International Conference on Virtual Reality Continuum and its Applications in Industry, Dec. 14-15, 2009, 6 pages.
Z. Zhang, "A Flexible New Technique for Camera Calibration", IEEE Transactions on Pattern Analysis and Machine Intelligence, vol. 22, No. 11 (2000): 1330-1334, Dec. 2, 1998, 22 pages.
D. Douxchamps, K. Chihara, "High-Accuracy and Robust Localization of Large Control Markers for Geometric Camera Calibration", IEEE Transactions on Pattern Analysis and Machine Intelligence, vol. 31, No. 2, Feb. 2009, 8 pages.
Dec. 12, 2016 International Search Report issued in Application No. PCT/US2016/052862, 13 pages.
International Preliminary Report on Patentability dated Feb. 1, 2018 for PCT Application No. PCT/US2016/052862, 13 pages.

\* cited by examiner

FIG. 8

CAMERA CALIBRATION USING SYNTHETIC IMAGES

BACKGROUND

Field of the Disclosure

The present disclosure relates generally to cameras and, more particularly, to calibration of cameras.

Description of the Related Art

Three-dimensional (3-D) camera vision systems use a model of a camera to relate objects in the 3-D space to the two-dimensional (2-D) image formed by the objects on an image plane in the camera. Model parameters include intrinsic parameters that are used to characterize each individual camera. Intrinsic parameters include a focal length of the camera lens, a center of projection of the lens, one or more distortion coefficients, and scaling of the image in the X direction and the Y direction. The model parameters also include extrinsic parameters (which may be referred to as poses) that characterize the translation and rotation of one or more cameras relative to the calibration targets. For example, the extrinsic parameters of an individual camera (or camera rig including multiple cameras) include the X, Y, and Z coordinates that define the translation of the camera and the pitch, roll, and yaw values that define the rotation of the camera relative to the target. Additional extrinsic parameters can be used to characterize the relative translation or rotation of multiple cameras that are rigidly attached to each other in a camera rig. Further extrinsic parameters include parameters that describe the relative position and orientation of multiple calibration targets that are rigidly attached to each other. The extrinsic parameters may also include contextual information such as an ambient lighting condition, a time of day, a weather condition, and the like.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The model parameters of a camera (or camera rig) are calibrated using a calibration pattern (or target pattern). The calibration pattern may be a planar pattern such as a grid of circles having different sizes, multiple planar patterns in different planes that include the same or different patterns, multiple spheres of the same or different sizes that are attached to a rigid structure, or other types of patterns that can be imaged by the camera or camera rig. One approach uses a target detection algorithm to identify centers of ellipses in the image plane corresponding to the circles in the planar calibration pattern. A separate calibration algorithm receives the estimated locations of the detected centers from the target detection algorithm and estimates the model parameters by minimizing (or at least reducing) a distance in pixel space between the detected centers and circle centers predicted based on values of the model parameters. Information indicating the uncertainties in the locations of the detected centers is lost when the ellipse centers are passed to the calibration algorithm and cannot be used to estimate the model parameters. Furthermore, perspective distortion introduces biases that make it difficult or impossible to observe the actual center of a projected circle. For example, a fisheye lens, which may have a field of view of 180° or more, does not project circles on to ellipses because of radial distortion of the image by the fisheye lens.

Another approach compares a rendered synthetic image of a target to intensity values of the pixels in an image of the target captured by the camera. This approach models the camera as an ideal pinhole camera and consequently the model does not include intrinsic parameters to describe geometric lens distortions, which are assumed to be relatively small so that they can be accounted for by applying corrections to the undistorted image. However, many lens systems (such as fisheye lenses) introduce significant distortions that cannot be accurately modeled by applying corrections to the image rendered based on an ideal pinhole camera.

As described herein, the accuracy of a calibration of the parameters that define a model of a camera can be increased by rendering pixels in a synthetic image of a target pattern by tracing rays from the pixels to corresponding points on the target pattern based on model parameters for the camera. For example, rays can be traced from central points in the pixels to an intersection point in the target pattern and intensities of the pixels can be determined based on proximity of the intersection point to a feature in the target pattern. For another example, the area represented by each pixel in the synthetic image may be subdivided into a 16×16 array of 256 elements. The intensity associated with each element is determined by tracing a ray from the element to the corresponding point on the target pattern based on the model parameters and applying the intensity of the corresponding point to the element. The total intensity for each pixel is determined by averaging the intensities for each of the elements that represent the pixel. The model parameters are updated to values that reduce or minimize a measure of distance between intensities of the pixels in the synthetic image and intensities of pixels in an actual image of the target pattern generated by the camera. In some embodiments, the measure of the distance is a square of a difference between intensities of the pixels in the actual image and corresponding pixels in the synthetic image. The model parameters may then be updated by applying a least-squares minimization technique (such as Gauss-Newton) to the distance measures for each pixel. Target poses for different images may be included in the set of model parameters, which may then be determined by reducing or minimizing the distance measure over intensities for pixels in the different images. Multiple cameras (e.g., in a fixed array of cameras or a fly-eye type camera) can be calibrated by including target poses that are determined for the different cameras relative to one of the cameras.

Figure 1:
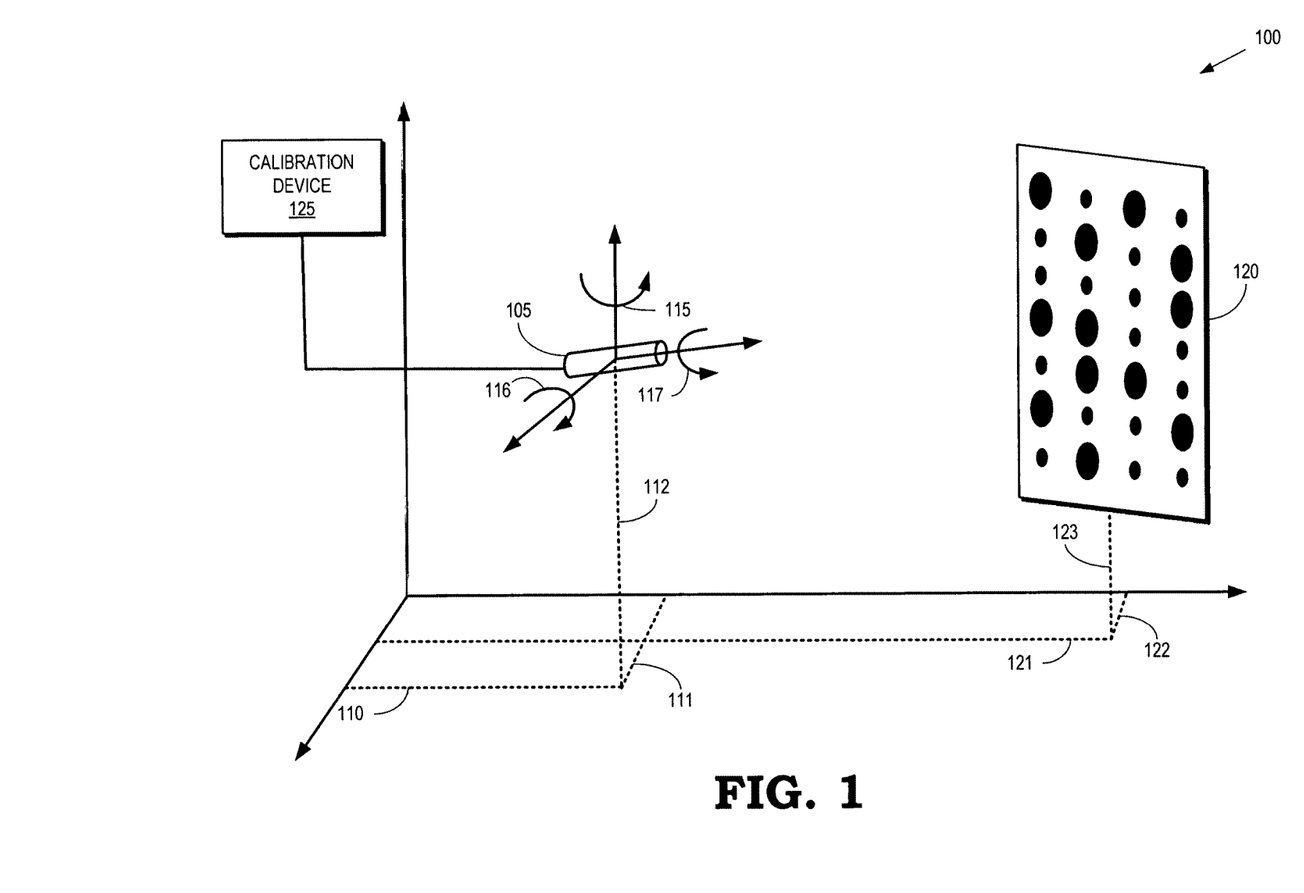
FIG. 1 is a diagram of a calibration system for calibrating model parameters of a camera according to some embodiments.

FIG. 1 is a diagram of a calibration system 100 for calibrating model parameters of a camera 105 according to some embodiments. The camera 105 is implemented as a wide-angle imaging camera having a fisheye lens or other wide-angle lens to provide a wider angle view of the local environment. For example, the camera 105 may be used to capture images in a field of view within a viewing angle of 180° or more. The camera 105 may be primarily configured for machine vision image capture for purposes of location detection. For example, the camera 105 may be used in a head mounted display (HMD) or other virtual reality/augmented reality image capture and display system. The machine-vision-specific configuration of the camera 105 may prioritize light-sensitivity, lens distortion, frame rate, global shutter capabilities, and faster data readout from the image sensor over user-centric camera configurations that focus on, for example, pixel resolution. Other embodiments of the camera 105 are implemented as a narrow-angle imaging camera having a typical angle of view lens to provide a narrower angle view of the local environment.

The camera 105 is characterized by a set of model parameters that include intrinsic model parameters representative of internal characteristics of the camera 105. For example, the camera 105 includes a lens (or optical system including multiple lenses) that is used to project an image onto a focal plane or imaging plane within the camera 105. The intrinsic model parameters may therefore include a focal length and a center of projection of the camera lens or optical system. The lens or optical system in the camera 105 may distort the image or magnify the image. To illustrate, camera lenses are typically radially symmetric and introduce radial distortions such as barrel distortion, pincushion distortion, or mustache distortion. The intrinsic model parameters may therefore include one or more distortion coefficients. For example, the relation between an undistorted image point $X_i$ and the corresponding distorted point $X_{dist,i}$ can be described by a radial displacement model parameter $\kappa_i$ according to:

$$X_i = X_{dist,i}\left(1 + \sum_{i=1} \kappa_i r^{2i}\right)$$

where r is the radial displacement in normalized coordinates. Additional intrinsic model parameters may be included to characterize higher order distortions. Camera lenses may also magnify images along one or more directions and so the intrinsic model parameters may include parameters indicating scaling of the image in the X direction and the Y direction caused by the lens or optical system in the camera 105. The intrinsic model parameters may also include one or more parameters that characterize chromatic aberration introduced by the lens or optical system.

The set of model parameters also includes extrinsic model parameters (which may also be referred to as poses) that characterize the position and orientation of the camera 105. For example, the extrinsic parameters of the camera 105 include the X, Y, and Z coordinates 110, 111, 112 that define the position of the camera 105. The location and orientation of the coordinate system used to identify the coordinates 110, 111, 112 is arbitrary and, in some embodiments, is chosen so that the origin of the coordinate system corresponds to a particular entity in the calibration system 100, as described below. The extrinsic model parameters may also include parameters indicative of one or more degrees of rotation such as: left/right rotation (i.e., yaw angle 115), forward/backward tilt (i.e., pitch angle 116), and side-to-side pivot (i.e., roll angle 117), all relative to a fixed gravitational reference or other relative or absolute reference. Additional extrinsic parameters can be used to characterize multiple cameras that are rigidly attached to each other in a camera rig. For example, the extrinsic model parameters may also include the relative position and orientation of the camera 105 with respect to one or more other cameras, as discussed below. The extrinsic model parameters may also include contextual information such as an ambient lighting condition, a time of day, a weather condition, and the like.

The calibration system 100 includes one or more calibration targets 120. The calibration target 120 includes a target pattern formed of circles or ellipses having different sizes. However, as discussed herein, some embodiments of the calibration target are implemented with other target patterns in two or three dimensions such as multiple planar patterns that include the same or different patterns deployed in the same plane or different planes, multiple spheres of the same or different sizes that are attached to a rigid structure, or other types of patterns that can be imaged by the camera 105. The position of the calibration target 120 is represented by the X, Y, Z coordinates 121, 122, 123. As discussed herein, the camera 105 is calibrated by comparing an actual image of the calibration target 120 to a synthetic image that is generated based on the model parameters of the camera 105. Thus, the set of model parameters used to characterize the camera 105 during the calibration process includes extrinsic model parameters that indicate the position of the camera 105 relative to the calibration target 120, which may be determined by comparing the coordinates 110, 111, 112 and the coordinates 121, 122, 123. In some embodiments, the origin of the coordinate system may be defined to correspond to the location of the calibration target 120 so that the extrinsic model parameters that indicate the position of the camera 105 are the same as the extrinsic model parameters that indicate the X, Y, Z coordinates 110, 111, 112 of the camera 105. Although a single calibration target 120 is shown in FIG. 1, some embodiments of the calibration system 100 may include multiple calibration targets. Moreover, other target patterns such as spirals or star patterns may be used as the calibration target 120. The target patterns may be black-and-white, grayscale, or color patterns.

A calibration device 125 is used to calibrate the model parameters that characterize the camera 105. The calibration device 125 may be implemented as hardware, firmware, software, or any combination thereof. For example, the calibration device 125 may include a memory element for storing software or firmware. The calibration device 125 may also include a processor for executing the instructions included in the software or firmware to perform the calibration of the camera 105. The calibrated model parameters may then be stored in the memory element or provided to the camera 105. The calibration device 125 may be a standalone entity that is external to the camera 105 or the calibration device 125 may be implemented as an integral part of the camera 105.

The calibration device 125 calibrates the model parameters based on a comparison of an actual image of the calibration target 120 captured by the camera 105 and a synthetic image of the calibration target 120 that is rendered based on the model parameters. The actual image and the synthetic image are represented by intensity values for an array of pixels corresponding to sensors in the camera 105 that are used to capture images. The intensity values in the actual image represent intensities of light falling on the corresponding sensors in the camera 105 during an exposure. The intensity values in the synthetic image represent estimated intensity values that are predicted or simulated based upon the model parameters, as discussed below. Some embodiments of the calibration device 125 render pixels in the synthetic image of the calibration target 120 by tracing a plurality of rays from each of the pixels to corresponding points on the calibration target 120. The ray tracing is performed based on the model parameters of the camera 105. The calibration device 125 then modifies the model parameters to reduce or minimize a measure of distance between intensities of the pixels in the synthetic image and intensities of pixels in the actual image generated by the camera 105. The calibration process may be iterated until one or more convergence criteria are satisfied.

Some embodiments of the calibration device 125 match the synthetic image of the calibration target 120 to the actual image captured by the camera 105 by simultaneously estimating the intrinsic and extrinsic model parameters that characterize the camera 105. For example, the intrinsic and extrinsic model parameters may be represented by a parameter vector p. The calibration device 125 determines the value of the parameter vector p that minimizes a sum of squares of differences between intensities of the pixels in the synthetic image and intensities of pixels in the actual image according to the least-squares minimization function:

$$\operatorname{argmin}_p (\Sigma_u [I(u) - T(W^{-1}(u, p_t, p_c))]^2) \quad (1)$$

where:
T(v) indicates the expected intensity on the calibration target (0=black, 1=white)
$v \in \mathbb{R}$ is the target coordinate, e.g., in meters
I is the intensity of the actual image at the pixel u
$u = (u_x, u_y) \in \Omega = \{0 \ldots w-1\} \times \{0 \ldots h-1\}$ is a pixel coordinate
w, h are the image dimensions
$p = (p_t, p_c)$ are the model parameters (or warp parameters)
$p_t$ are the extrinsic model parameters or target pose, i.e. $p_t \in SE(3)$
$p_c$ are the intrinsic model parameters
$W = P \circ A$ is the warp function that transforms a vector v from target coordinates into camera coordinates using the transform A and then projects the vector into pixel coordinates using the projection function P, i.e., $W(v, p_t, p_c) = P(A(v, p_t), p_c)$.
$A(v, p_t)$ is a translation followed by a rotation
$P(v, p_c)$ Is a function that maps 3-D points to pixel coordinates and depends upon the camera model parameters.
$W^{-1}$ computes the corresponding rate for a location in a pixel (un-projection or re-projection) in the observed image and intersects the ray with the target plane. The inverse of the warp function $W^{-1}$ therefore transforms a pixel location (u) into a location v in the plane of the target based on the model parameters $p = (p_t, p_c)$.

The calibration device 125 solves the least-squares minimization problem defined by equation (1) by iteratively improving an initial guess or estimate of the model parameters that represent the camera 105.

Some embodiments of the calibration device 125 use a Gauss-Newton least squares optimization algorithm to iteratively solve the nonlinear least-squares optimization problem. A first-order Taylor expansion of equation (1) can be used to relate a current estimate of the parameter vector $p_i$ to a modified estimate of the parameter vector $p_{i+1}$ as follows:

$$p_{i+1} = p_i + \operatorname{argmin}_{\Delta p} \left( \sum_u \left[ I(u) + \frac{\delta T}{\delta p} \Delta p - T(W^{-1}(u, p_t, p_c)) \right]^2 \right) \quad (2)$$

where $\Delta p$ is a vector of changes in the parameter vector and $\delta T/\delta p$ is the gradient of the intensity on the calibration target 120 as a function of the parameter vector at a pixel location. As discussed below, the intensity gradients may be computed numerically from the synthetic image using intensity values determined by ray tracing and applying a smoothing function to ensure that the intensity is a continuous function of the parameter vectors. For example, the intensity of the rendered image (T) is first determined for the current set of model parameters $p_i$ and then the intensity is recomputed for a second image rendered after varying the parameter vector by small amount in each direction $p_i + \delta p_i$. The Jacobian $\delta T/\delta p$ is then calculated from the difference between the intensities in the two rendered images. The Gauss-Newton algorithm uses equation (2) to iteratively modify the values of the parameter vectors until a convergence criterion is reached. For example, the algorithm may converge when changes in the parameter vectors during a given iteration fall below a threshold value.

Some embodiments of the calibration device 125 use a Lucas-Kanade optical flow algorithm to iteratively solve the nonlinear least-squares optimization problem. The optical flow algorithm decomposes the gradient $\delta I/\delta p$ into an image gradient:

$$\nabla_u I = \frac{\delta I}{\delta u} = \left( \frac{\delta I}{\delta u_x}, \frac{\delta I}{\delta u_y} \right)$$

and a Jacobian of the warp function $\delta W/\delta p$. The linearized minimization problem defined by equation (2) may then be rewritten as:

$$p_{i+1} = p_i + \operatorname{argmin}_{\Delta p} \left( \sum_u \left[ I(u) + \nabla_u I \frac{\delta W}{\delta p} \Delta p - T(W^{-1}(u, p_t, p_c)) \right]^2 \right) \quad (3)$$

where W is composed of the coordinate transformation A and the projection P. The Jacobians are computed with respect to the model parameters $p_t$ and $p_c$ individually and then combined into a single matrix:

$$\frac{\delta W}{\delta p_t} = \frac{\delta P(v, p_c)}{\delta v} \cdot \frac{\delta A}{\delta p_t}$$

$$\frac{\delta W}{\delta p_c} = \frac{\delta P(v, p_c)}{\delta p_c}$$

As discussed below, the Jacobians may be computed numerically from the synthetic image using intensity values determined by ray tracing and applying a smoothing function to ensure that the intensity is a continuous function of the parameter vectors. The Lucas-Kanade algorithm uses equation (3) to iteratively modify the values of the parameter vectors until a convergence criterion is reached. For example, the algorithm may converge when changes in the parameter vectors during a given iteration fall below a threshold value.

In the Lucas-Kanade optical flow algorithm, the inverse of the warp function $W^{-1}$ transforms pixels in the actual image to target coordinates by re-projecting the image and intersecting with the plane of the calibration target 120. In each iteration of the optimization algorithm, the inverse of the warp function $W^{-1}$ is used to select a sampling position on the calibration target 120 for each pixel $u \in Q$ in the actual image based on the current best estimate of the intrinsic model parameters $p_t$ and the extrinsic model parameters $p_c$, which may also be referred to as the target pose. For each sample on the target, the Jacobian $$\frac{\delta W}{\delta p}$$

indicates how the re-projected pixel coordinate moves in the image with respect to changes in the intrinsic model parameters $p_t$ and the extrinsic model parameters $p_c$. The Jacobian $$\frac{\delta W}{\delta p}$$

is evaluated at $v = W^{-1}(u, p_t, p_c)$ so that it's re-projection lands in the vicinity of the pixel u. The change in the difference between the actual image and the rendered image with respect to changes in the intrinsic model parameters $p_t$ and the extrinsic model parameters $p_c$ can then be determined by combining the Jacobian $$\frac{\delta W}{\delta p}$$

and the image gradient $\Delta_u I$ at the pixel u.

Some embodiments of the calibration system 100 include multiple calibration targets 120. Actual and synthetic images of the multiple calibration targets 120 can be used to calibrate the parameters of the camera 105. The intensities of the images are represented by $I^i$, $i \in \{1, N_i\}$ and additional model parameters $(p_t^i)$ are included for each image. For example, the calibration device 125 may determine the value of the parameter vectorp that minimizes a difference between intensities of the pixels in the synthetic images and intensities of pixels in the actual images according to the least-squares minimization function:

$$\operatorname{argmin}_p (\Sigma_i \Sigma_u [I^i(u) - T(W^{-1}(u, p_t^i, p_c))]^2) \quad (4)$$

where:
i, u are indices for the different images and the pixels in the images, respectively.
$p = (p_t^1, p_t^2, \ldots, p_t^N, p_c)$ is a vector representing the set of model parameters for the camera 105.

The other variables in equation (4) correspond to the variables defined above for equation (2).

Figure 2:
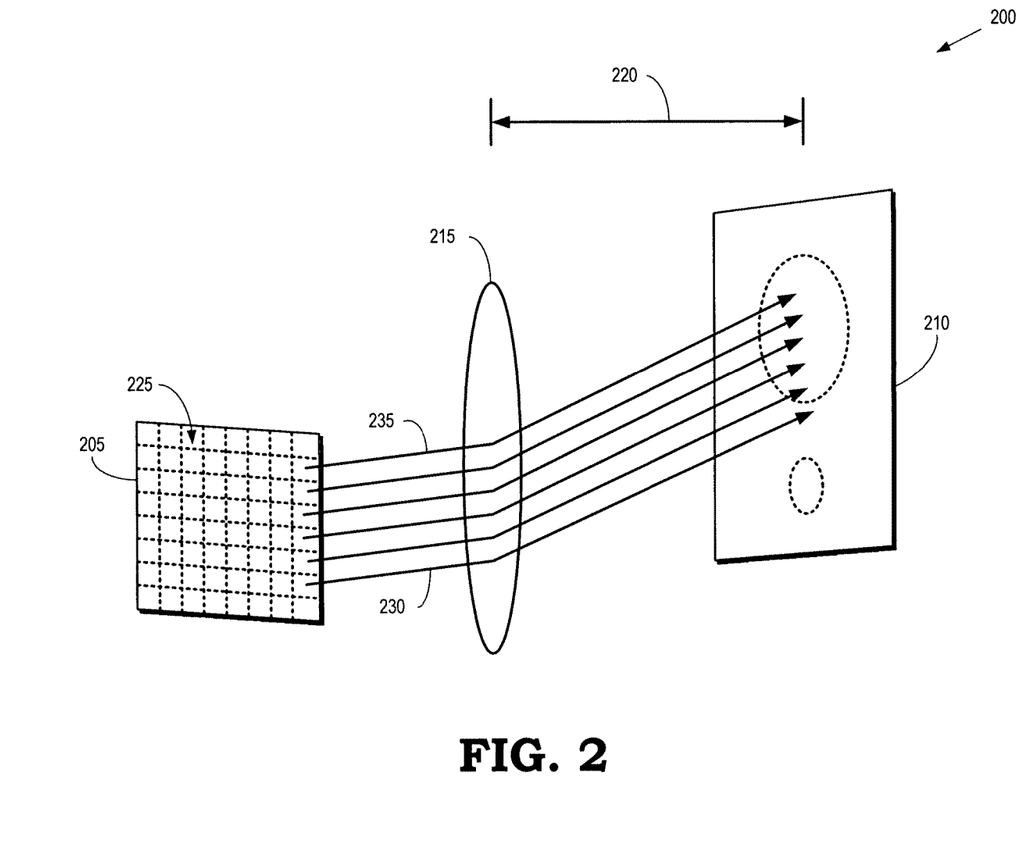
FIG. 2 is a diagram of a calibration system that is used perform ray tracing to generate a synthetic image based on model parameters of a camera according to some embodiments.

FIG. 2 is a diagram of a calibration system 200 that is used perform ray tracing to generate a synthetic image based on model parameters of a camera according to some embodiments. The calibration system 200 includes a pixel 205 that is one of a plurality of pixels implemented in the camera. The calibration system 200 also includes a portion 210 of a calibration target such as the calibration target 120 shown in FIG. 1. In the interest of clarity, the circles or ellipses that form the target pattern in the portion 210 of the calibration target are represented by dashed lines although in practice the circles or ellipses may be filled, as shown in FIG. 1. An ellipse 215 is used to represent the intrinsic model parameters of the camera such as the focal length, center of projection, distortion, magnification scaling, and the like. Extrinsic model parameters of the camera such as the X, Y, Z coordinates of the camera, the pitch, yaw, and roll of the camera, and the relative positions of the pixel 205 and the portion 210 of the calibration target are represented by the double-headed arrow 220.

A synthetic image of the calibration target (including the portion 210) is formed of intensity values of a plurality of pixels including the pixel 205. The synthetic image may therefore be rendered based on the model parameters 215, 220 using ray tracing from the pixel 205 to the portion 210 of the calibration target. In some embodiments, the synthetic image is determined by a calibration device such as the calibration device 125 shown in FIG. 1. An intensity value for the pixel 205 is determined by tracing one or more rays from one or more locations within the pixel 205 to the plane of the portion 210 of the calibration target.

In some embodiments, the pixel 205 is represented by a central point within the area of the pixel 205 and a single ray is traced from the pixel 205 to the portion 210 of the calibration target. A smoothing function (as discussed below) is applied to smooth the intensity value assigned to the pixel 205 based on overlap between the area of the pixel 205 and features in the calibration target. The degree of overlap may be determined by the proximity of a central point in the pixel 205 to a feature in the calibration target. The smoothing function ensures that the intensity is a continuous function of the model parameters.

In some embodiments, the pixel 205 may be subdivided into a plurality of pixel elements 225 (only one indicated by a reference numeral in the interest of clarity). Rays are then traced from each pixel element 225 to the portion 210 of the calibration target using the model parameters 215, 220 to determine the path of the rays from the pixel 205 to the portion 210. An intensity value is assigned to each pixel elements 225 based on an intensity at the point on the portion 210 that is intersected by the ray. For example, the ray 230 intersects the portion 210 at a location that is outside of any of the ellipses used to form the target pattern. The intensity of the pixel element 225 corresponding to the ray 230 is therefore assigned an intensity value corresponding to the white region of the portion 210, such as an intensity value of 0. For another example, the ray 235 intersects the portion 210 at a location that is inside a large lips of the target pattern. The intensity of the pixel elements 225 corresponding to the ray 235 is therefore assigned an intensity value corresponding to the black region of the portion 210, such as an intensity value of 1. A total intensity for each pixel 205 is determined by averaging the intensities for each of the pixel elements 225 in the corresponding pixel 205. A smoothing function may also be applied to the intensity values to ensure that the intensity is a continuous function of the model parameters.

Figure 3:
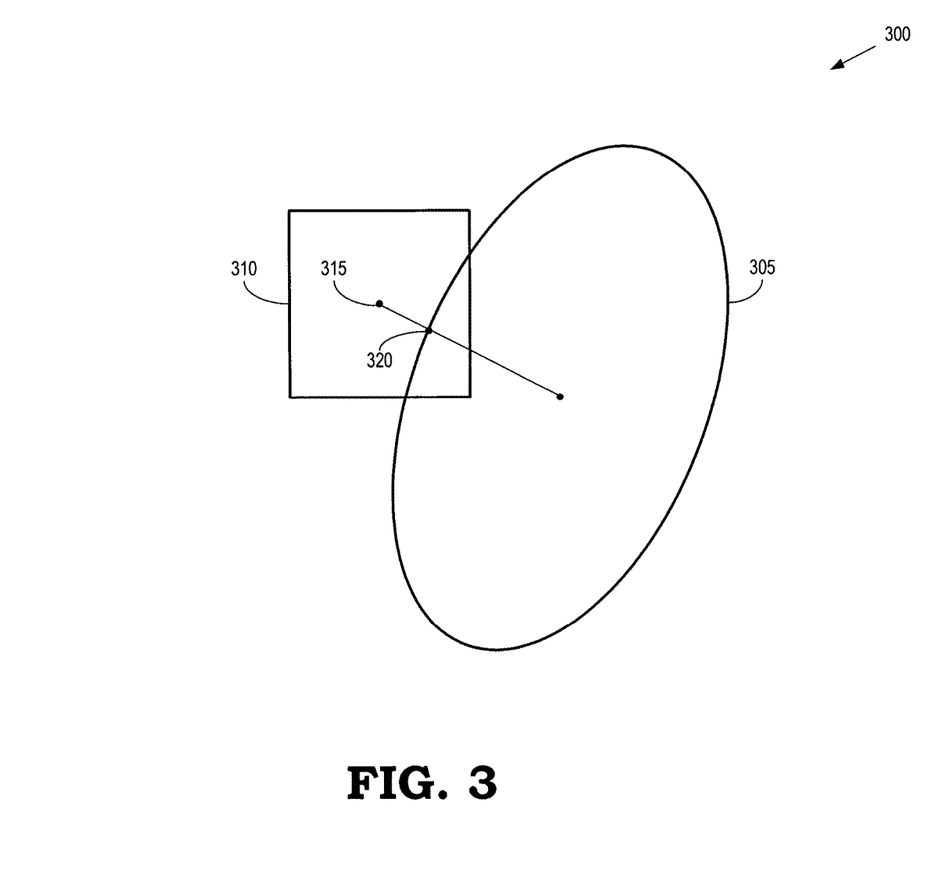
FIG. 3 is a diagram of a synthetic image of an ellipse formed by ray tracing and a corresponding pixel according to some embodiments.

FIG. 3 is a diagram of a synthetic image 300 of an ellipse 305 formed by ray tracing and a corresponding pixel 310 according to some embodiments. In the interest of clarity, the ellipse 305 is represented by an unfilled ellipse although in practice the ellipse may be filled, as shown in FIG. 1. The gradients in equations (2) and (3) are computed numerically using intensity values for pixels in the synthetic image. The rendering function should therefore produce intensities that are continuous function of the model parameters to ensure that the numerical derivatives with respect to the model parameters are non-zero. A calibration device (such as the calibration device 125 shown in FIG. 1) may apply a smoothing function to the intensity values assigned to pixels in the synthetic image. The smoothing function may be used in addition to or instead of embodiments of the ray tracing algorithm described with respect to FIG. 2.

Some embodiments of the smoothing function determine whether to render the pixel as white, black, or a gray value based on the proximity of the pixel to features in the calibration target image. For example, the calibration device may use ray tracing based upon the model parameters to determine an intersection point 315 in the calibration target plane for a ray that emanates from a central point in the pixel 310. The calibration device then determines the closest point 320 on the ellipse 305 to the intersection point 315 and computes a pixel distance δ between the intersection point 315 and the closest point 320. If the pixel distance δ is smaller than a threshold τ, the intensity of the pixel is rendered as a gray value:

$$I = 0.5 \cdot \left(1 - \frac{\delta}{\tau}\right);$$

if the intersection point 315 is within the ellipse 305, and $$I = 0.5 \cdot \left(1 + \frac{\delta}{\tau}\right);$$

it the intersection point 315 is outside of the ellipse 305. The pixels are rendered as white (1=1) if δ>τ and the intersection point 315 is outside of the ellipse 305. The pixels are rendered as black (I=0) if δ>τ and the intersection point 315 is inside of the ellipse 305. The smoothing function thereby approximates the area of intersection between the ellipse 305 and the pixel 310 and scales the intensity approximately in proportion to the area of intersection.

Figure 4:
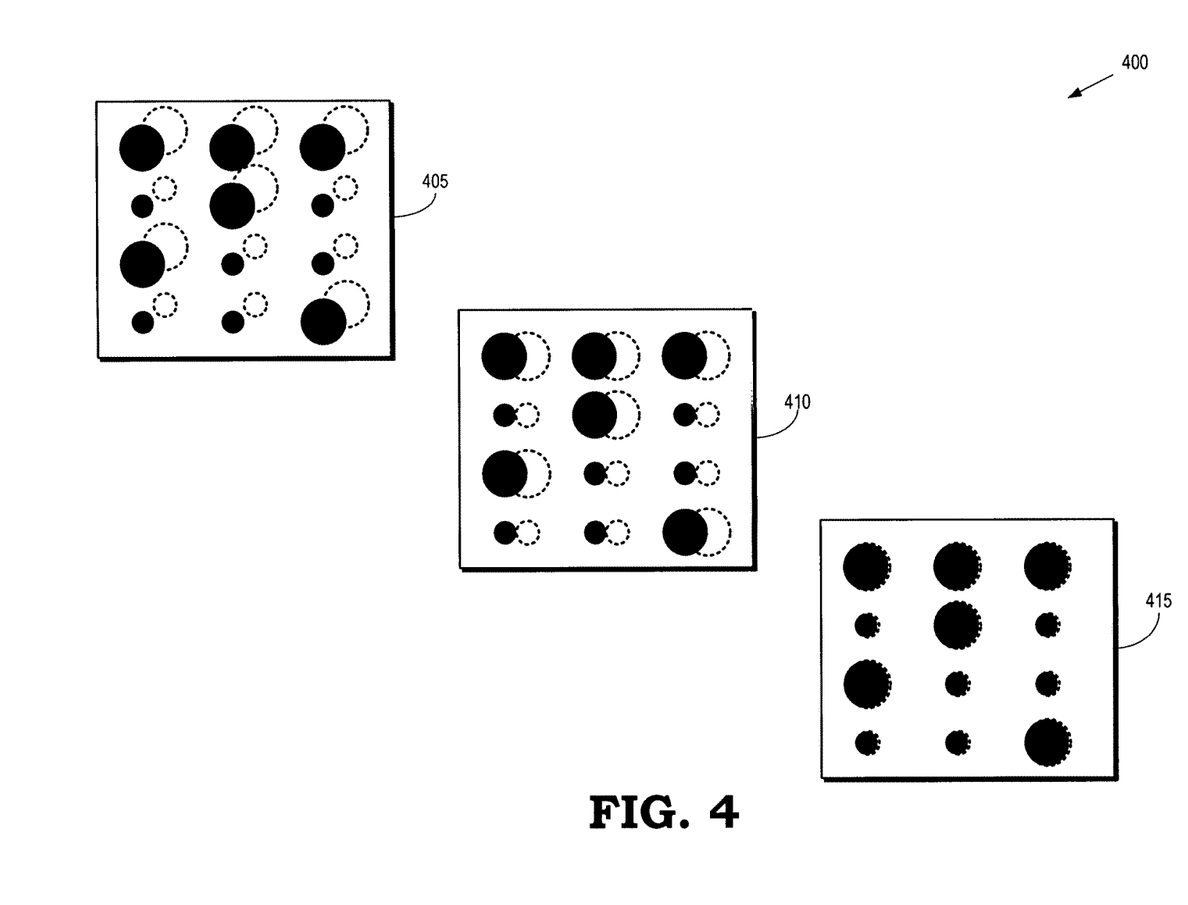
FIG. 4 is a diagram depicting a sequence of comparisons of an actual image and a synthetic image in sequential iterations of a calibration algorithm according to some embodiments.

FIG. 4 is a diagram depicting a sequence 400 of comparisons of an actual image and a synthetic image in sequential iterations of a calibration algorithm according to some embodiments. Comparisons 405, 410, 415 show an actual image captured by a camera and a synthetic image generated by calibration device based on set of model parameters. The actual image captured by the camera is indicated by the filled black circles. The actual image remains the same in each of the comparisons 405, 410, 415. Dashed circles are used to indicate the synthetic image generated by the calibration device. The synthetic image changes between the comparisons 405, 410, 415 in response to modification of the model parameters by the calibration device.

The comparison 405 shows the actual image and an initial synthetic image that is generated based upon an initial estimate of the model parameters that represent the camera. The initial estimate may be generated based on a default set of model parameters or using another calibration technique to initialize the model parameters. The calibration device determines modifications to the model parameters, e.g., by performing a least-squares minimization based on equation (2) or equation (3), as discussed herein. The model parameters may then be updated.

The comparison 410 shows the actual image and a modified synthetic image that is generated based upon the modified model parameters determined by the calibration device. The calibration device performs another iteration of the least-squares minimization to determine additional modifications to the model parameters, e.g., by performing another iteration of least-squares minimization based on equation (2) or equation (3), as discussed herein. The model parameters may then be updated.

The comparison 415 shows the actual image and a modified synthetic image that is generated based upon the modified model parameters determined by the calibration device using the actual image and a modified synthetic image shown in the comparison 410. The comparison 415 indicates that the iterative least-squares minimization has converged. Convergence may be indicated by the least-squares differences between the intensities in the actual image and the modified synthetic image falling below a threshold. Convergence may also be indicated by the amplitude of changes in the model parameters falling below a threshold.

Figure 5:
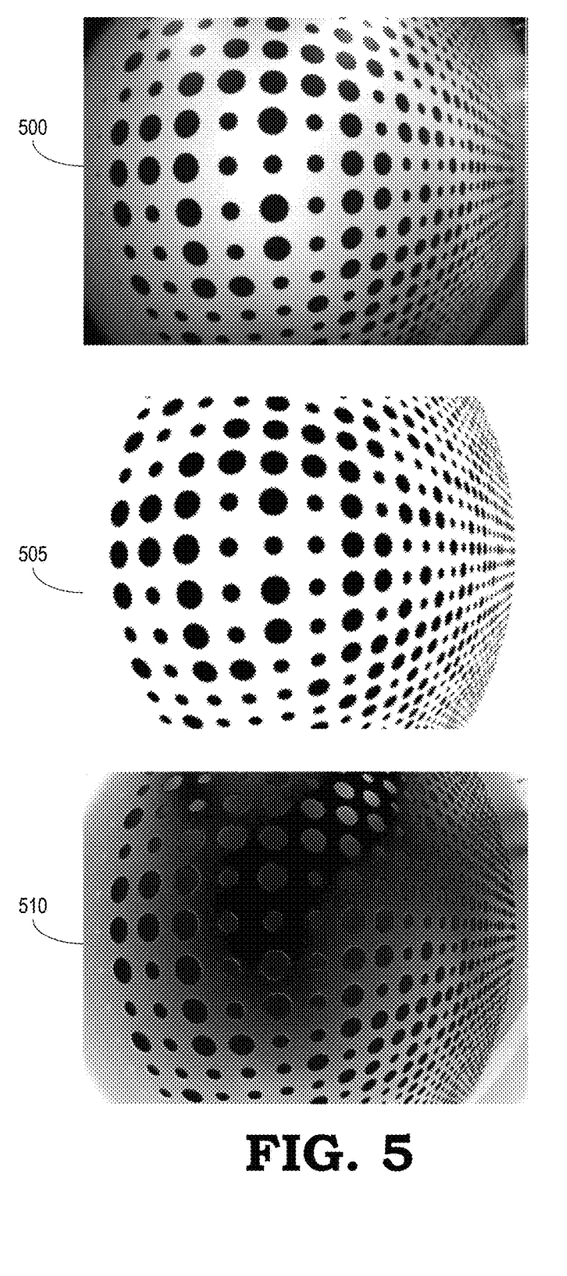
FIG. 5 shows an actual image of a calibration target taken by a camera using a fisheye lens according to some embodiments.

FIG. 5 shows an actual image 500 of a calibration target taken by a camera using a fisheye lens according to some embodiments. The calibration target is a planar target including a pattern of large and small circles, such as the calibration target 120 shown in FIG. 1. The large field of view of the fisheye lens generates significant radial distortion in the actual image 500. A synthetic image 505 of the calibration target is generated by a calibration device based on model parameters that characterize the camera used to capture the actual image 500. A difference image 510 illustrates differences between the intensities at each of the pixels in the actual image 500 and the synthetic image 505. The intensity differences illustrated by the 510 may be used to calibrate the model parameters of the camera, as discussed herein.

Figure 6:
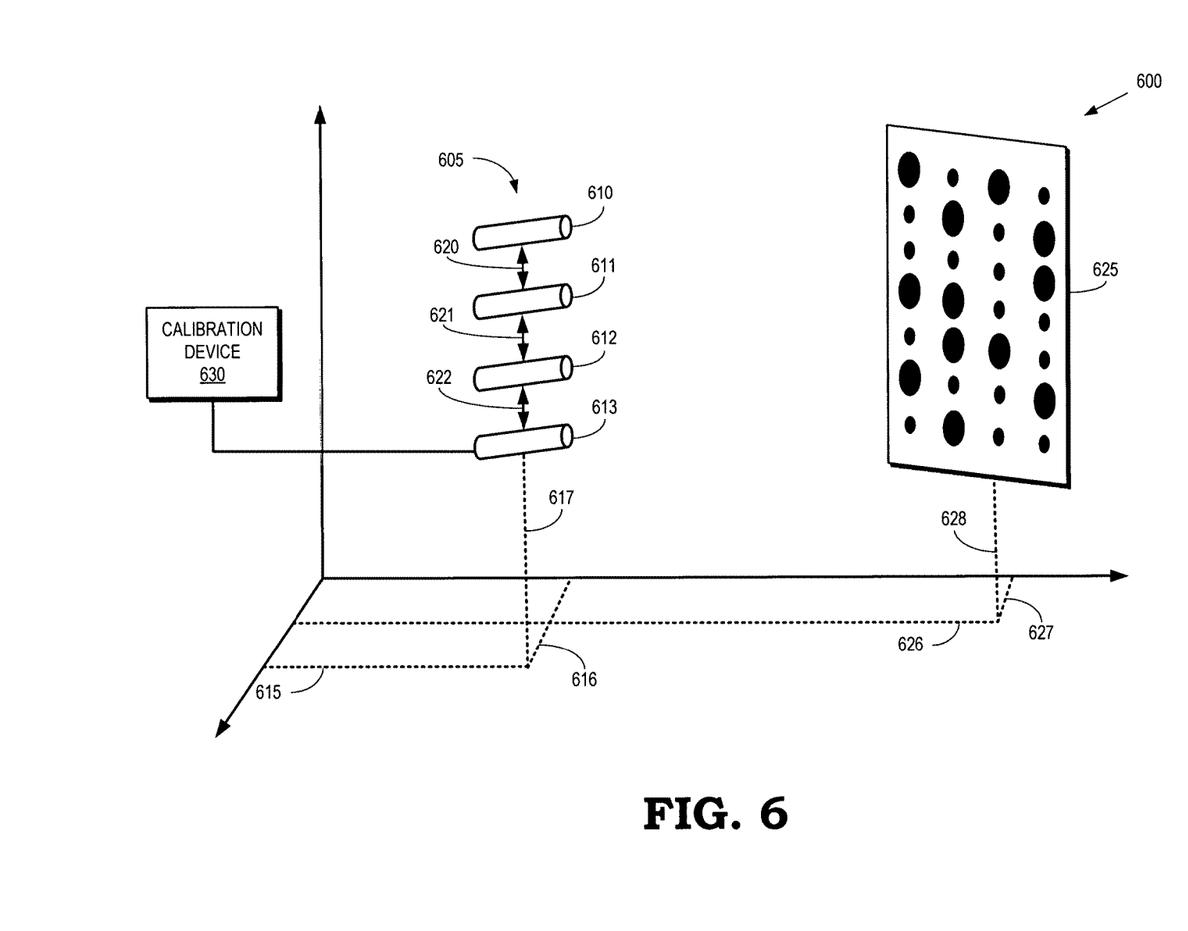
FIG. 6 is a diagram of a calibration system for calibrating model parameters of a camera rig according to some embodiments.

FIG. 6 is a diagram of a calibration system 600 for calibrating model parameters of a camera rig 605 according to some embodiments. The camera rig 605 includes multiple individual cameras 610, 611, 612, 613 (collectively referred to as "the cameras 610-613") that are rigidly interconnected by a rig or other structure. The cameras 610-613 may be wide-angle imaging cameras to provide a wider angle view of the local environment or narrow imaging cameras that provide a narrower angle view of the local environment. The cameras 610-613 are characterized by a set of model parameters that include intrinsic model parameters representative of internal characteristics of the cameras 610-613. For example, each of the cameras 610-613 may be characterized by a separate set of intrinsic model parameters including a focal length, a center of projection, one or more distortion coefficients, and one or more scaling/magnification parameters.

The camera rig 605 is also characterized by extrinsic model parameters including the X, Y, and Z coordinates 615, 616, 617 that define the position of the camera rig 605. The camera rig 605 and each of the individual cameras 610-613 may also be characterized by pitch, yaw, and roll values (not shown in FIG. 6 in the interest of clarity). Extrinsic model parameters may also be used to characterize the relative positions of the individual cameras 610-613. For example, the X, Y, and Z coordinates 615, 616, 617 may indicate the position of the camera 613 and additional extrinsic model parameters 620, 621, 622 may be used to indicate the positions of the cameras 610, 611, 612 relative to the camera 613. Extrinsic model parameters may also be used to indicate the relative rotational orientations of the cameras 610-613, such as pitch, yaw, and roll values.

The calibration system 600 includes one or more calibration targets 625 that include a target pattern formed of circles or ellipses having different sizes. The position of the calibration target 625 is represented by the X, Y, Z coordinates 626, 627, 628. As discussed herein, a calibration device 630 calibrates the camera rig 605 by comparing actual images of the calibration target 625 to synthetic images that are generated based on the model parameters of the cameras 610-613. For example, the calibration device 630 may determine the value of the parameter vector p that minimizes a difference between intensities of the pixels in the synthetic images and intensities of pixels in the actual image according to the least-squares minimization function:

$$\operatorname{argmin}_p (\Sigma_j \Sigma_i \Sigma_u [I^i(u) - T(W^{-1}(u, \bar{p}_t^j, p_t^i, p_c^j))]^2) \quad (5)$$

where:
  i, j, u are indices for the different cameras 610-613 in the camera rig 605, the different images, and the pixels in the images, respectively.
  $\bar{p}_t^i$, $j \in \{1, N_j\}$, are model parameters that represent the transformation from a base coordinate frame associated with the base camera 613 to the other cameras 610-612, $N_j$ is the number of cameras 610-613 in the camera rig, and $p_t^1$ is the identity transform.
  $p = (\bar{p}_t^2, \bar{p}_t^3, \ldots, \bar{p}_t^{N_j}, p_t^1, p_t^2, \ldots, p_t^N, p_c)$ is a vector representing the set of model parameters for the camera rig 605.

The other variables in equation (5) correspond to the variables defined above for equation (4).

Figure 7:
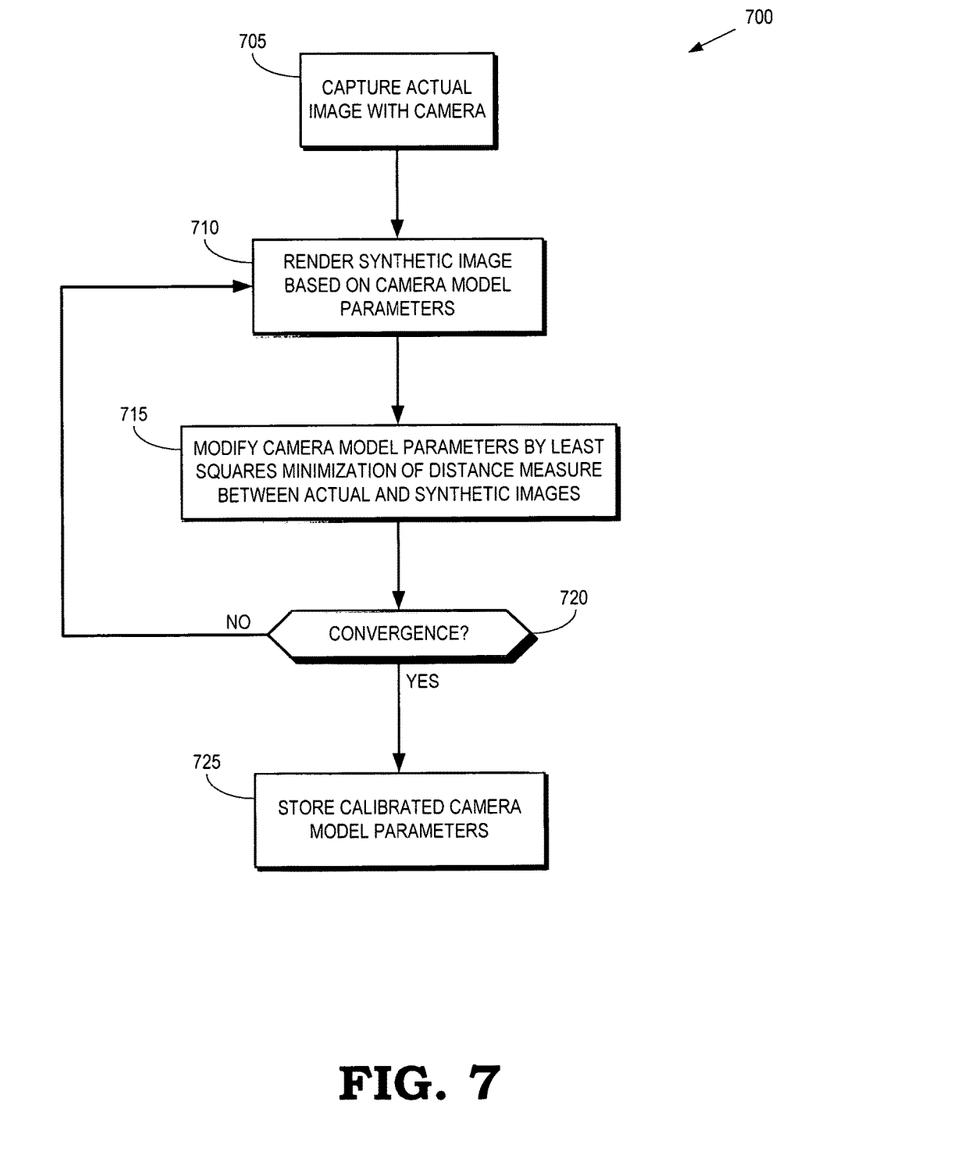
FIG. 7 is a flow diagram of a method for calibrating the model parameters that characterize a camera according to some embodiments.

FIG. 7 is a flow diagram of a method 700 for calibrating the model parameters that characterize a camera according to some embodiments. The method 700 may be implemented in some embodiments of the calibration device 125 shown in FIG. 1 or the calibration device 630 shown in FIG. 2. At block 705, the camera captures an actual image of a calibration target. The actual image is represented by intensity values received by pixels in an image plane of the camera and information indicating the intensity values may be stored, e.g., in a memory implemented in the camera or an external memory. At block 710, the calibration device renders a synthetic image of the calibration target based on the camera model parameters. For example, the calibration device may render the synthetic image of the calibration target by tracing rays from locations associated with the pixels to corresponding locations at the calibration target and then associating intensity values at the locations on the calibration target to the pixel locations.

At block 715, the calibration device modifies the model parameters of the camera by performing a least-squares minimization on a measure of distance between intensity values at the pixels in the actual and synthetic images. Some embodiments of the calibration device modify the values of the model parameters on the basis of the least-squares minimization function defined in equation (1). Some embodiments of the calibration device use a Gauss-Newton algorithm to solve for the updated model parameters, e.g., as defined in equation (2). Some embodiments of the calibration device solve for the updated model parameters using a Lucas-Kanade optical flow algorithm, e.g., as defined in equation (3). The model parameters may also be determined on the basis of multiple images using the least-squares minimization function defined in equation (4) and the model parameters for an array of multiple cameras can be determined using the least-squares minimization function defined in equation (5).

At decision block 720, the calibration device determines whether the modified model parameters satisfy a convergence criteria. For example, the calibration device may determine whether a fractional (or percentage) change in the model parameters is below a threshold value. The fractional or percentage change may be determined for each model parameter or for combinations of the model parameters. For another example, the calibration device may determine whether the least-squares difference between the actual image and the synthetic image is below a threshold value, e.g., as indicated by equation (1). Some embodiments of the calibration device may use combinations of these convergence criteria or other convergence criteria. As long as the convergence criterion is not satisfied, the method 700 flows to block 710 so that the model parameters are iteratively updated until the convergence criterion is satisfied. Once the convergence criterion is satisfied, the method 700 flows to block 725.

At block 725, the calibrated model parameters are stored. Some embodiments of the calibration device store the calibrated model parameters at an external location or on other non-transitory computer-readable storage media for subsequent use by the camera. The calibration device may also store the calibrated model parameters in a non-transitory computer-readable storage media implemented in the camera so that the camera can access this information directly.

Figure 8:
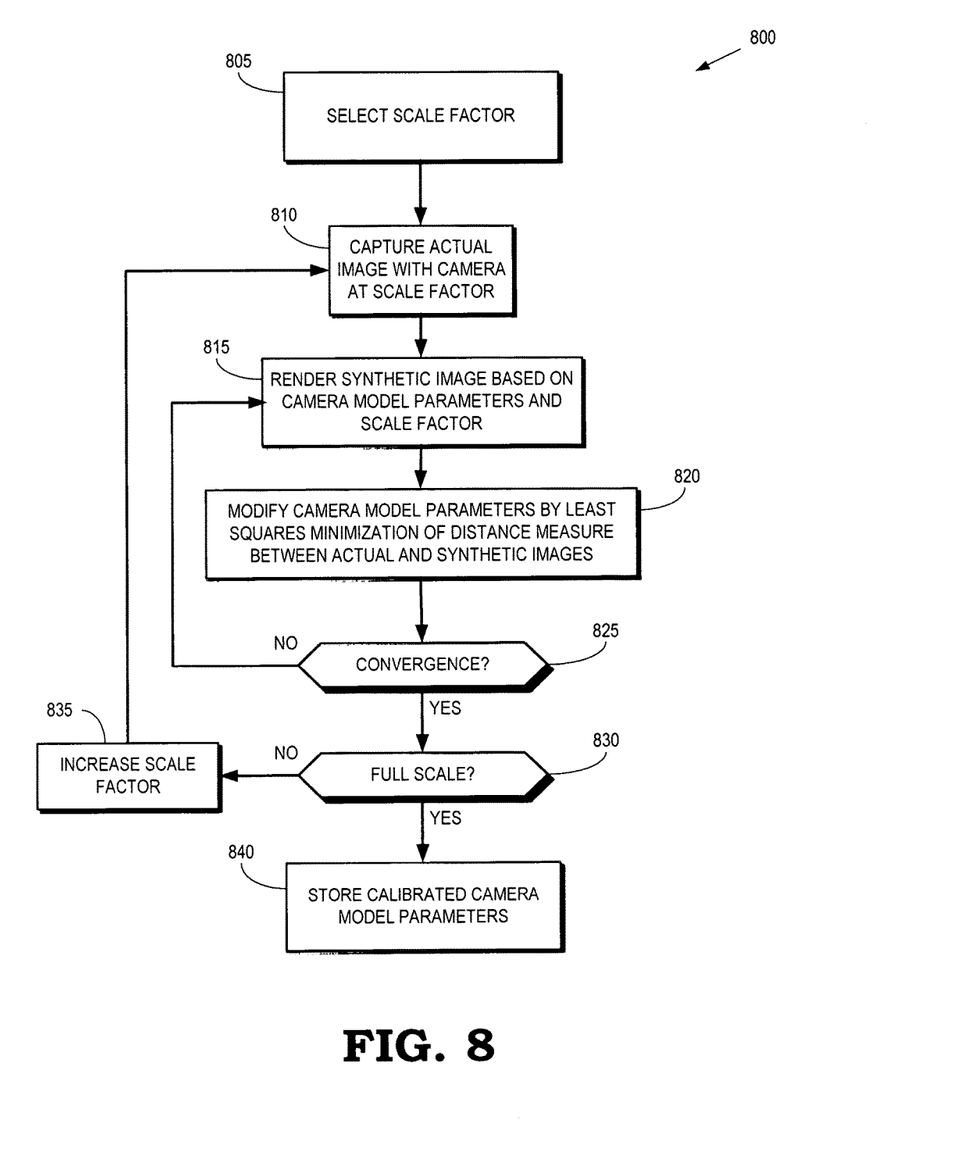
FIG. 8 is a flow diagram of a method for calibrating the model parameters that characterize a camera using a coarse-to-fine scaling technique according to some embodiments.

FIG. 8 is a flow diagram of a method 800 for calibrating the model parameters that characterize a camera using a coarse-to-fine scaling technique according to some embodiments. The method 800 may be implemented in some embodiments of the calibration device 125 shown in FIG. 1 or the calibration device 630 shown in FIG. 2. At block 805, the calibration device chooses a scaling for the image. For example, the calibration device may initially choose a coarse scaling so that each pixel captures or represents an intensity value associated with a larger portion of the calibration target. Using a coarse scaling smooths out high-resolution features, which helps the method 800 avoid local minima in the least-squares minimization algorithm. For example, choosing a relatively coarse scaling to capture the actual image from the calibration target 120 shown in FIG. 1 may substantially remove the smaller circles from the actual image and allow the least-squares minimization to be performed based substantially on the pattern of larger circles in the calibration target 120. The minimization algorithm may therefore avoid local minima that occur when small circles are aligned with large circles in the actual and synthetic images.

At block 810, the camera captures an actual image of the calibration target at the scaling determined in block 805. The actual image is represented by intensity values received by pixels in an image plane of the camera and information indicating the intensity values may be stored, e.g., in a memory implemented in the camera or an external memory. At block 815, the calibration device renders a synthetic image of the calibration target based on the camera model parameters and the scaling determined in block 805. For example, the calibration device may render the synthetic image of the calibration target by tracing rays from locations associated with the pixels to corresponding locations at the calibration target and then associating intensity values at the locations on the calibration target to the pixel locations.

At block 820, the calibration device modifies the model parameters of the camera by performing a least-squares minimization on a measure of distance between intensity values at the pixels in the actual and synthetic images. As discussed herein, some embodiments of the calibration device modify the values of the model parameters on the basis of the least-squares minimization function defined in equation (1) using a Gauss-Newton algorithm to solve for the updated model parameters, e.g., as defined in equation (2) or a Lucas-Kanade optical flow algorithm, e.g., as defined in equation (3). The model parameters may also be determined on the basis of multiple images using the least-squares minimization function defined in equation (4). The model parameters for an array of multiple cameras can be determined using the least-squares minimization function defined in equation (5).

At decision block 825, the calibration device determines whether the modified model parameters satisfy a convergence criteria. As discussed herein, the convergence criterion may indicate whether a fractional (or percentage) change in the model parameters is below a threshold value or whether the least-squares difference between the actual image and the synthetic image is below a threshold value, e.g., as indicated by equation (1). Some embodiments of the calibration device may use combinations of these convergence criteria or other convergence criteria. As long as the convergence criterion is not satisfied, the method 800 flows to block 815 so that the model parameters are iteratively updated until the convergence criterion is satisfied. Once the convergence criterion is satisfied, the method 800 flows to block 830.

At decision block 830, the calibration device determines whether the actual image and the synthetic image are at full-scale so that the actual image and the synthetic image are at the highest possible resolution and the pixels in the actual image and the synthetic image represent the smallest possible portion of the calibration target. If not, the method 800 flows to block 835 and the scale factor is increased to the next highest scale factor with the next highest resolution. For example, the method 800 may use a predetermined set of scale factors such as ⅛, ¼, ½, and full scale. The method 800 may therefore iterate through the set of scale factors until the modified camera model parameters represent the camera model parameters determined based on the actual image and the synthetic image at full-scale. Once the calibration device determines that camera model parameters have been determined based on the actual image and the synthetic image at full-scale, the method 800 flows to block 840.

At block 840, the calibrated model parameters are stored. Some embodiments of the calibration device store the calibrated model parameters at an external location or on other non-transitory computer-readable storage media for subsequent use by the camera. The calibration device may also store the calibrated model parameters in a non-transitory computer-readable storage media implemented in the camera so that the camera can access this information directly.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   rendering, at a calibration device, pixels in a synthetic image of a target pattern by tracing a plurality of rays from the pixels to corresponding points on the target pattern based on model parameters for a camera; and modifying, at the calibration device, the model parameters to reduce a measure of distance between intensities of the pixels in the synthetic image and intensities of pixels in an actual image of the target pattern generated by the camera wherein the model parameters comprise intrinsic model parameters and extrinsic model parameters; and wherein tracing the plurality of rays comprises tracing a ray from a central point in each pixel to a plane of the target pattern and determining an intensity for the pixel based on a proximity of the pixel to a feature in the target pattern.

2. The method of claim 1, wherein rendering pixels in the synthetic image further comprises:

subdividing a pixel into an array of elements;

tracing a ray from each element to a corresponding point on the target pattern based on the model parameters;

associating the intensity of the corresponding point with the element; and determining a total intensity for the pixel by averaging the intensities for each of the elements in the array associated with the pixel.

3. The method of claim 1, wherein modifying the model parameters to minimize the measure of distance comprises performing least-squares minimization of a sum of squares of differences between intensities of the pixels in the synthetic image and intensities of the pixels in the actual image.

4. The method of claim 3, wherein performing the least-squares minimization comprises determining gradients of the intensities at the pixels in the synthetic image as a function of the model parameters.

5. The method of claim 4, wherein determining the gradients of the intensities comprises rendering the pixels in the synthetic image to generate intensities that are continuous with respect to the model parameters.

6. The method of claim 3, wherein performing the least-squares minimization comprises performing the least-squares minimization using at least one of a Gauss-Newton least-squares optimization algorithm and a Lucas-Kanade optical flow algorithm.

7. The method of claim 3, wherein modifying the model parameters comprises modifying at least one model parameter from a set of model parameters including:

a focal length of a lens of the camera;

a center of projection of the lens of the camera;

at least one distortion coefficient representative of distortion caused by the lens of the camera;

a scaling in an X direction;

a scaling in a Y direction;

coordinates that define translation of the camera relative to the target pattern;

pitch, roll, or yaw values that define rotation of the camera relative to the target pattern;

coordinates that define translation of the camera relative to at least one other camera;

pitch, roll, or yaw values that define rotation of the camera relative to the at least one other camera; and at least one color parameter representative of chromatic aberration caused by the lens of the camera.

8. The method of claim 1, further comprising:

scaling the actual image by a scale factor, and wherein rendering the pixels in the synthetic image comprises rendering the pixels in the synthetic image based on the scale factor;

modifying the model parameters to minimize a measure of distance between intensities of the pixels in the synthetic image and intensities of pixels in the scaled actual image; and iteratively increasing the scale factor, rendering the pixels in the synthetic image, and modifying the model parameters.

9. An apparatus comprising:

a camera to capture an actual image of a target pattern; and a calibration device to render pixels in a synthetic image of the target pattern by tracing a plurality of rays from the pixels to corresponding points on the target pattern based on model parameters for the camera and to modify the model parameters to reduce a measure of distance between intensities of the pixels in the synthetic image and intensities of pixels in the actual image;

wherein the model parameters comprise intrinsic model parameters and extrinsic model parameters; and wherein the calibration device is to trace a ray from a central point in one of the pixels to a plane of the target pattern and to determine an intensity for the pixel based on proximity of the pixel to a feature in the target pattern.

10. The apparatus of claim 9, wherein the calibration device is to subdivide one of the pixels into an array of elements, trace a ray from each element to a corresponding point on the target pattern based on the model parameters, associate the intensity of the corresponding point with the element, and determine a total intensity for the pixel by averaging the intensities for each of the elements in the array associated with the pixel.

11. The apparatus of claim 9, wherein the calibration device is to perform least-squares minimization of a sum of squares of differences between intensities of the pixels in the synthetic image and intensities of the pixels in the actual image.

12. The apparatus of claim 11, wherein the calibration device is to determine gradients of the intensities at the pixels in the synthetic image as a function of the model parameters.

13. The apparatus of claim 12, wherein the calibration device is to render the pixels in the synthetic image to generate intensities that are continuous with respect to the model parameters.

14. The apparatus of claim 11, wherein the calibration device is to perform the least-squares minimization using at least one of a Gauss-Newton least-squares optimization algorithm and a Lucas-Kanade optical flow algorithm.

15. The apparatus of claim 9, wherein the calibration device is to modify at least one model parameter from a set of model parameters including:

a focal length of a lens of the camera;

a center of projection of the lens of the camera;

at least one distortion coefficient representative of distortion caused by the lens of the camera;

a scaling in an X direction;

a scaling in a Y direction;

coordinates that define translation of the camera relative to the target pattern;

pitch, roll, or yaw values that define rotation of the camera relative to the target pattern;

coordinates that define translation of the camera relative to at least one other camera;

pitch, roll, or yaw values that define rotation of the camera relative to the at least one other camera; and at least one color parameter representative of chromatic aberration caused by the lens of the camera.

16. The apparatus of claim 9, wherein the calibration device is to:
scale the actual image by a scale factor;
render the pixels in the synthetic image based on the scale factor;
modify the model parameters to minimize a measure of distance between intensities of the pixels in the scaled synthetic image and intensities of pixels in the scaled actual image; and
iteratively increase the scale factor, render the pixels in the synthetic image, and modify the model parameters.

17. A non-transitory computer readable storage medium embodying a set of executable instructions, the set of executable instructions to manipulate a processor to:
render, at a calibration device, pixels in a synthetic image of a target pattern by tracing a plurality of rays from the pixels to corresponding points on the target pattern based on model parameters for a camera, wherein tracing the plurality of rays comprises tracing a ray from a central point in each pixel to a plane of the target pattern and determining an intensity for the pixel based on a proximity of the pixel to a feature in the target pattern; and
modify, at the calibration device, the model parameters to minimize a measure of distance between intensities of the pixels in the synthetic image and intensities of pixels in an actual image of the target pattern generated by the camera.

18. The non-transitory computer readable storage medium of claim 17, wherein the processor is to:
subdivide each pixel into an array of elements;
trace a ray from each element to a corresponding point on the target pattern based on the model parameters; and
associate the intensity of the corresponding point with the element.

* * * * *